United States Patent
Kim et al.

(10) Patent No.: US 10,425,136 B2
(45) Date of Patent: Sep. 24, 2019

(54) METHOD AND APPARATUS FOR TRANSMITTING AND RECEIVING CONTROL INFORMATION

(71) Applicant: LG ELECTRONICS INC., Seoul (KR)

(72) Inventors: Heejin Kim, Seoul (KR); Jiwon Kang, Seoul (KR); Kitae Kim, Seoul (KR); Kilbom Lee, Seoul (KR); Kungmin Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/578,554

(22) PCT Filed: Jan. 29, 2016

(86) PCT No.: PCT/KR2016/001034
§ 371 (c)(1),
(2) Date: Nov. 30, 2017

(87) PCT Pub. No.: WO2016/204370
PCT Pub. Date: Dec. 22, 2016

(65) Prior Publication Data
US 2018/0159603 A1  Jun. 7, 2018

Related U.S. Application Data

(60) Provisional application No. 62/181,774, filed on Jun. 19, 2015, provisional application No. 62/184,879, (Continued)

(51) Int. Cl.
*H04L 27/26* (2006.01)
*H04B 7/06* (2006.01)
(Continued)

(52) U.S. Cl.
CPC ......... *H04B 7/0456* (2013.01); *H04B 7/0617* (2013.01); *H04L 27/2613* (2013.01);
(Continued)

(58) Field of Classification Search
CPC .................................................. H04L 27/2613
See application file for complete search history.

(56) References Cited

U.S. PATENT DOCUMENTS

2009/0247214 A1* 10/2009 Cai .................. H04W 52/0216
455/550.1
2011/0081901 A1  4/2011 Moulsley et al.
(Continued)

FOREIGN PATENT DOCUMENTS

KR  1020100049290 A  5/2010
WO  2013110212 A1  8/2013

*Primary Examiner* — Gbemileke J Onamuti
(74) *Attorney, Agent, or Firm* — Dentons US LLP

(57) ABSTRACT

The present invention relates to a method and apparatus for transmitting precoding information by a specific user equipment (UE) in a wireless communication system. More specifically, the present invention relates to a method comprising receiving group information from a base station (BS), the group information comprising information indicating a representative UE in a UE group and information indicating one or more member UEs, the specific UE being one of the one or more member UEs; receiving first control information transmitted from the representative UE or the BS, the first control information comprising first precoding information; determining second precoding information based on the first precoding information; and transmitting second control information comprising the determined second precoding information to the BS; and an apparatus therefor.

20 Claims, 7 Drawing Sheets

Related U.S. Application Data filed on Jun. 26, 2015, provisional application No. 62/195,804, filed on Jul. 23, 2015.

(51) Int. Cl.
  *H04B 7/0456* (2017.01)
  *H04B 7/0452* (2017.01)

(52) U.S. Cl.
  CPC .......... *H04B 7/0452* (2013.01); *H04B 7/0478* (2013.01); *H04B 7/0621* (2013.01)

(56) References Cited

U.S. PATENT DOCUMENTS

| | | | |
|---|---|---|---|
| 2011/0194511 A1* | 8/2011 | Chen | H04W 72/1289 370/329 |
| 2013/0294369 A1 | 11/2013 | Dinan | |
| 2015/0011230 A1 | 1/2015 | Noh et al. | |
| 2016/0119044 A1* | 4/2016 | Shattil | H04W 12/08 375/267 |

\* cited by examiner

[Fig. 1]
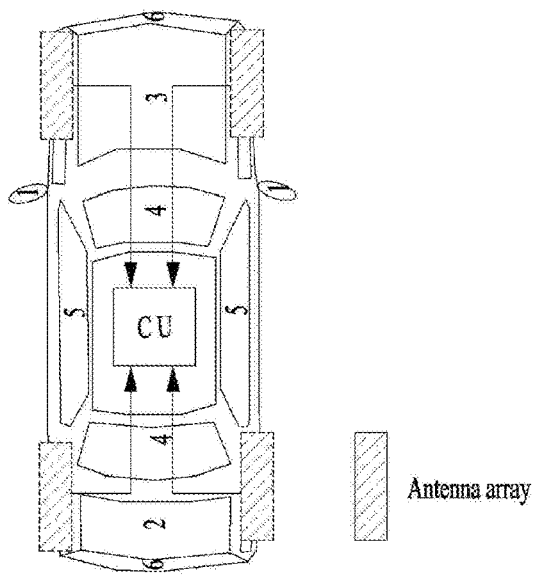
[Fig. 2]
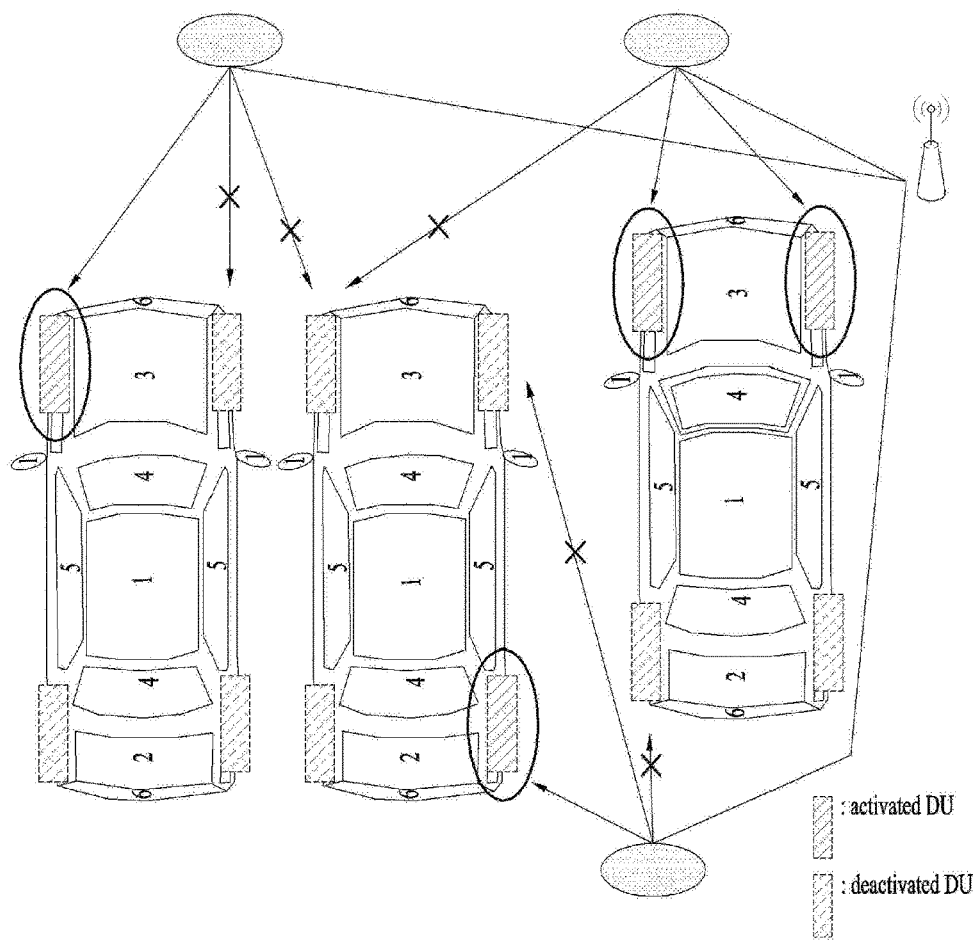

[Fig. 3]
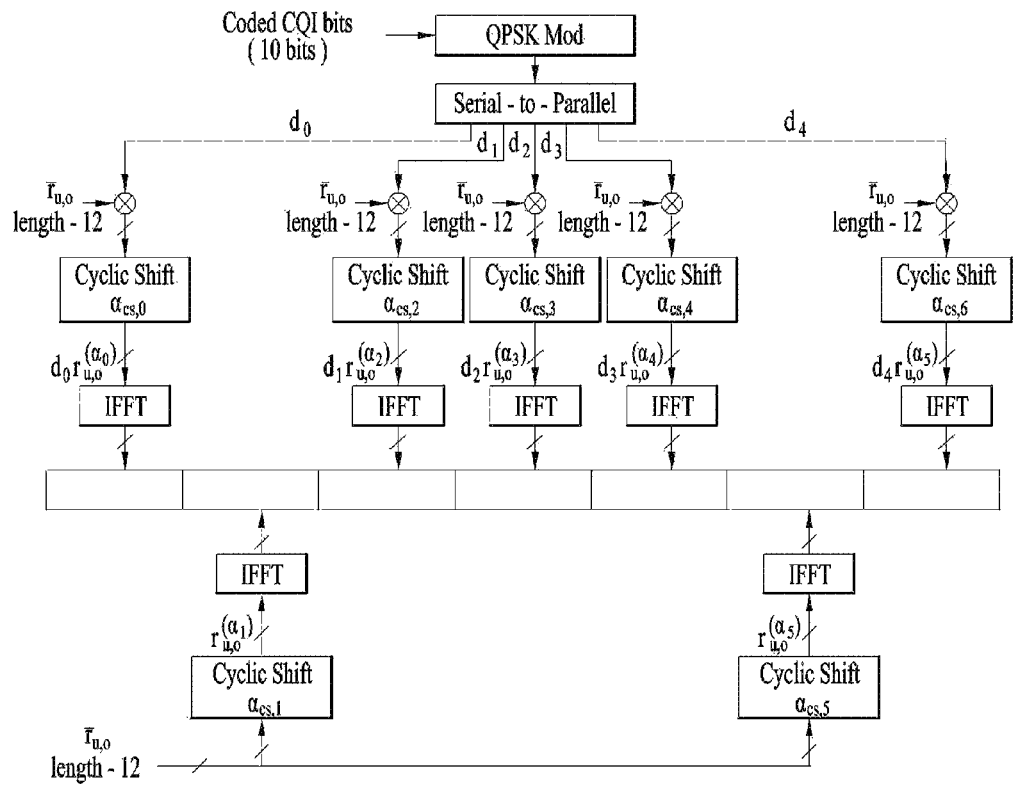
[Fig. 4]
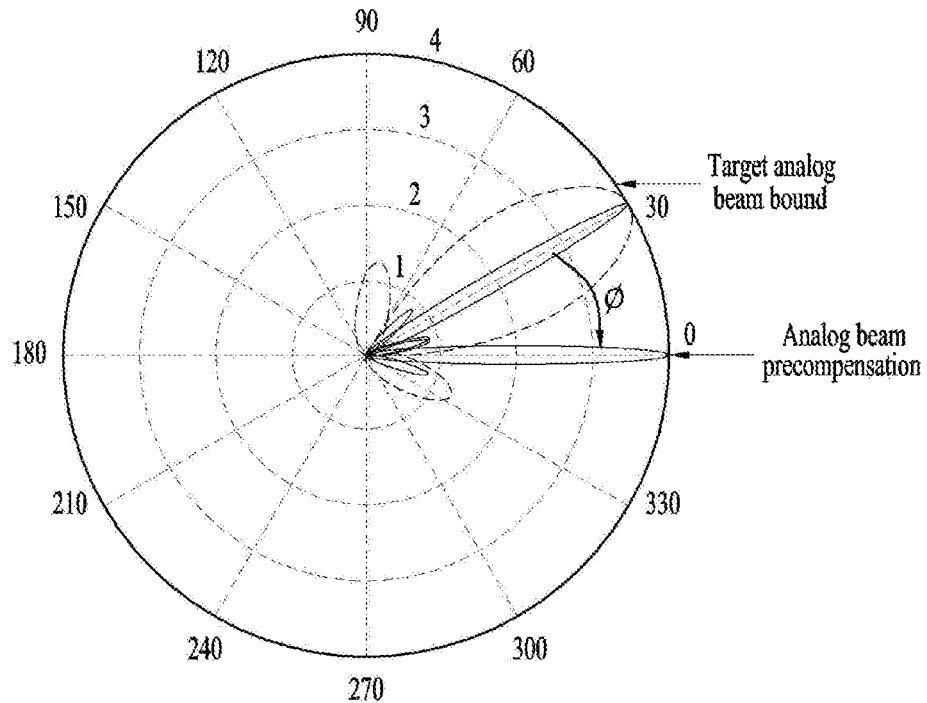

[Fig. 5]
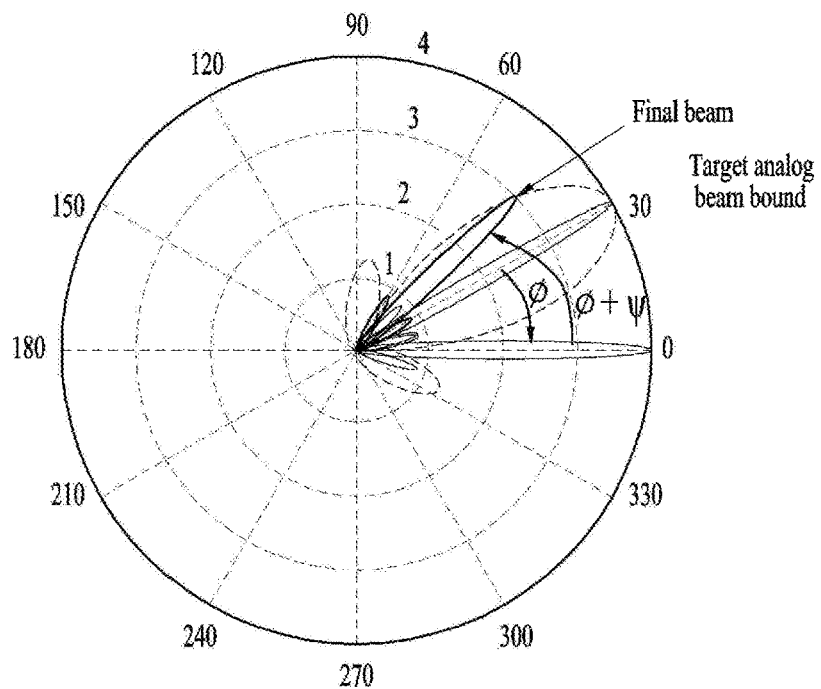
[Fig. 6]
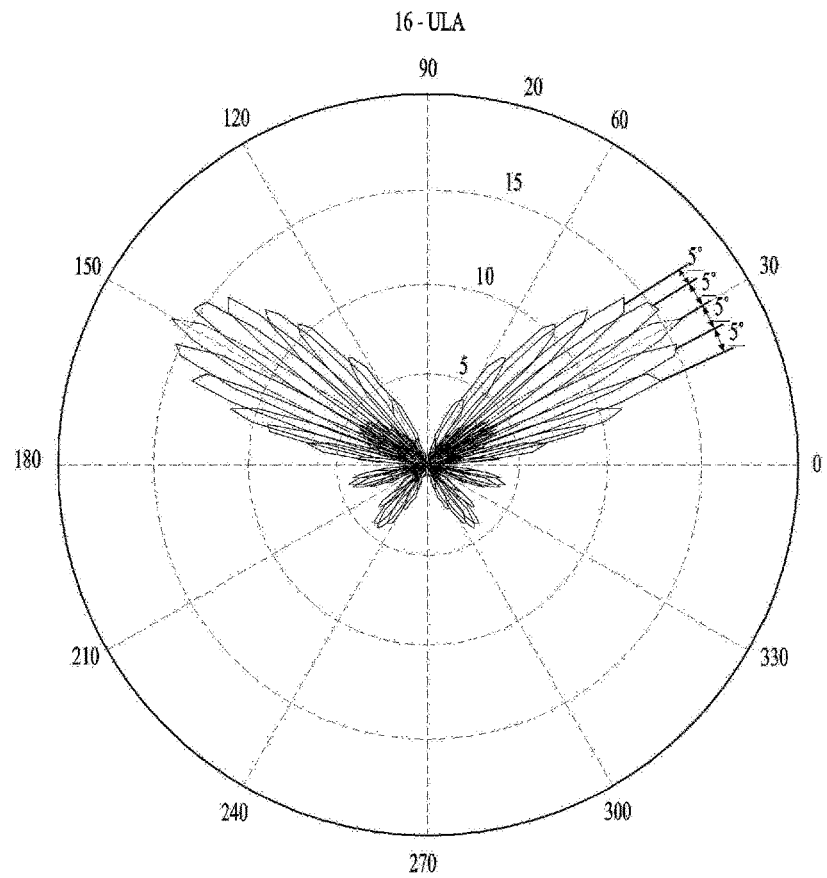

[Fig. 7]
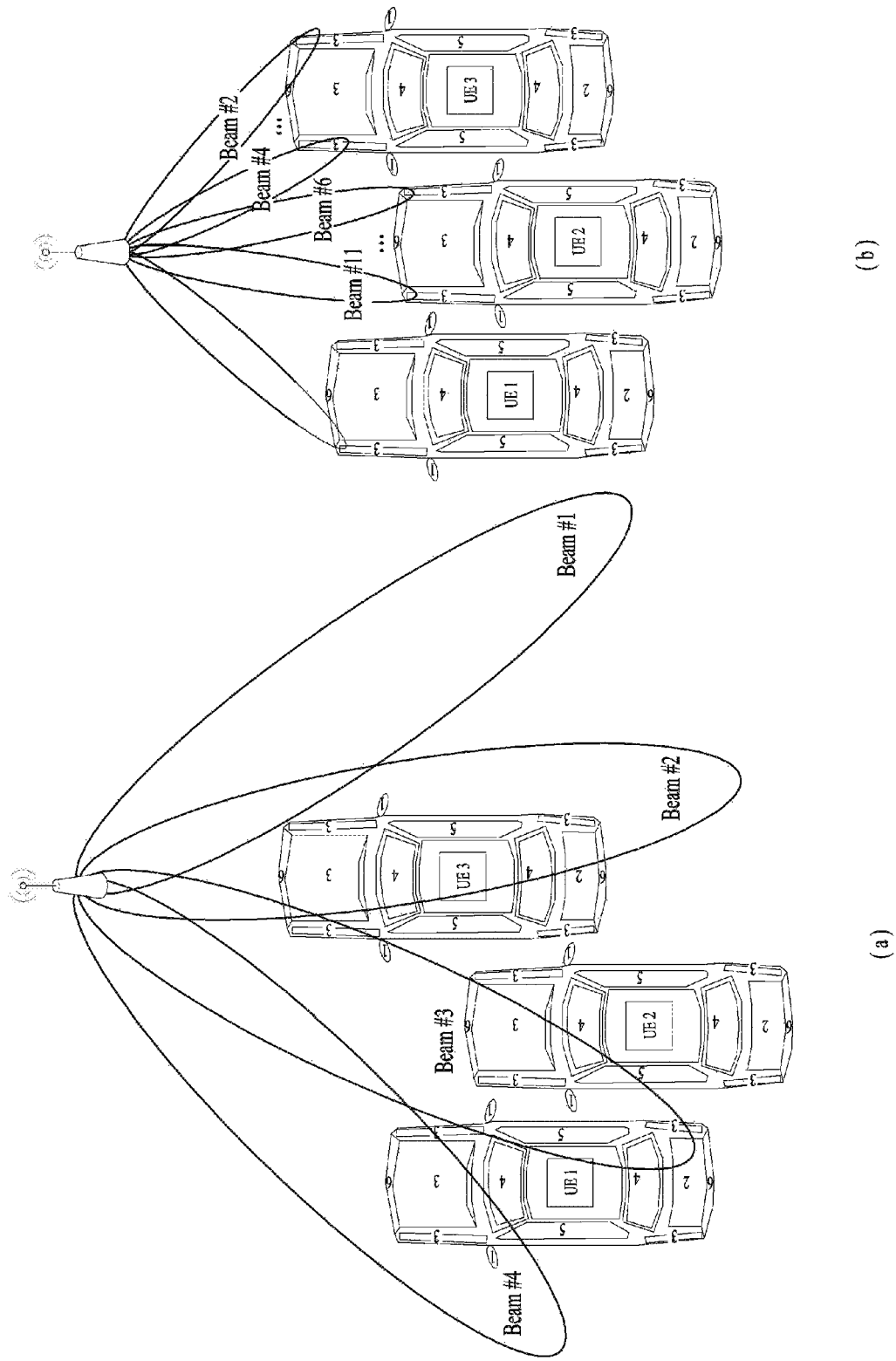

[Fig. 8]
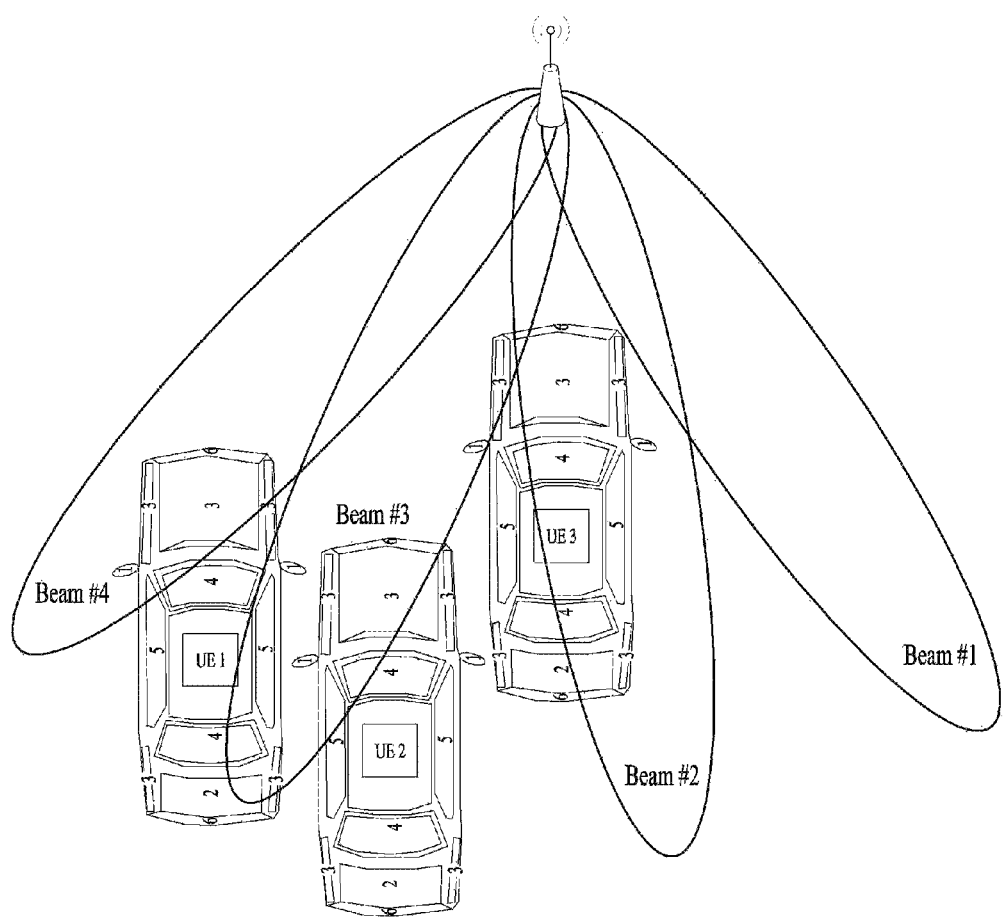

[Fig. 9]
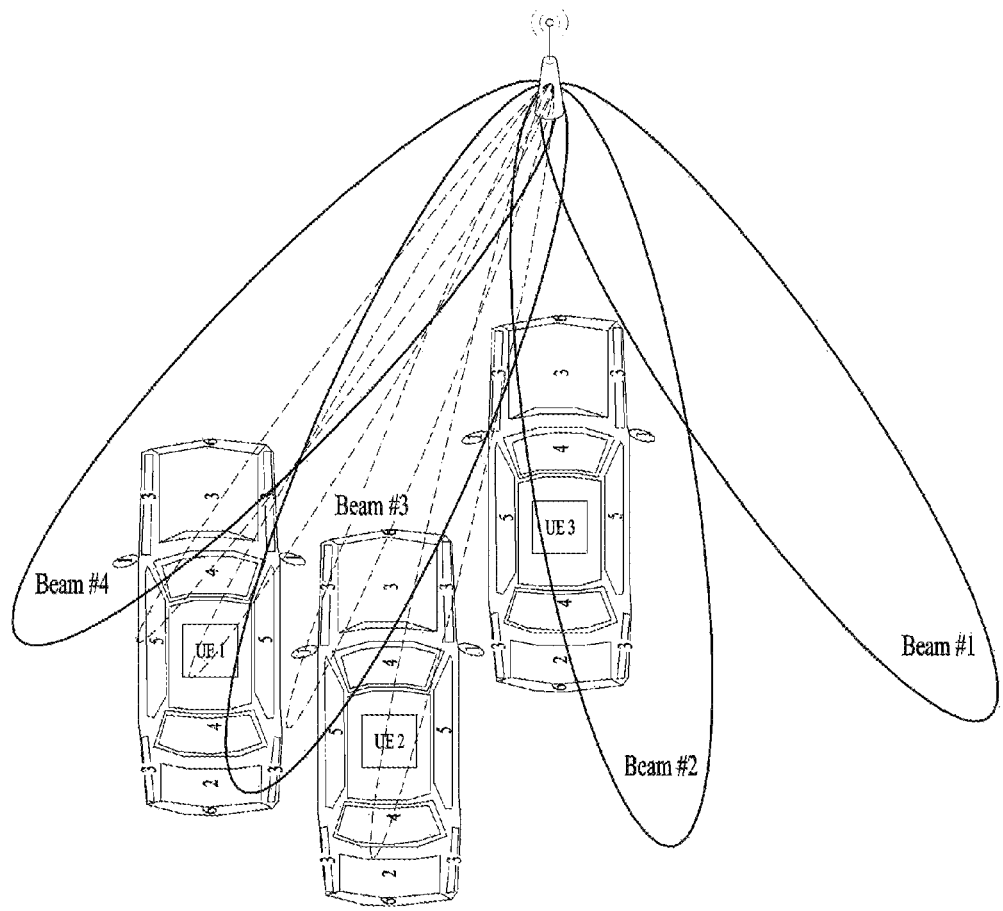
[Fig. 10]
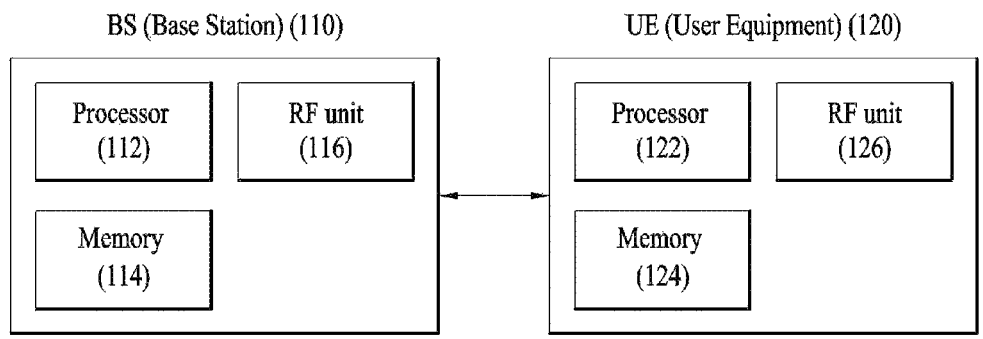

[Fig. 11]
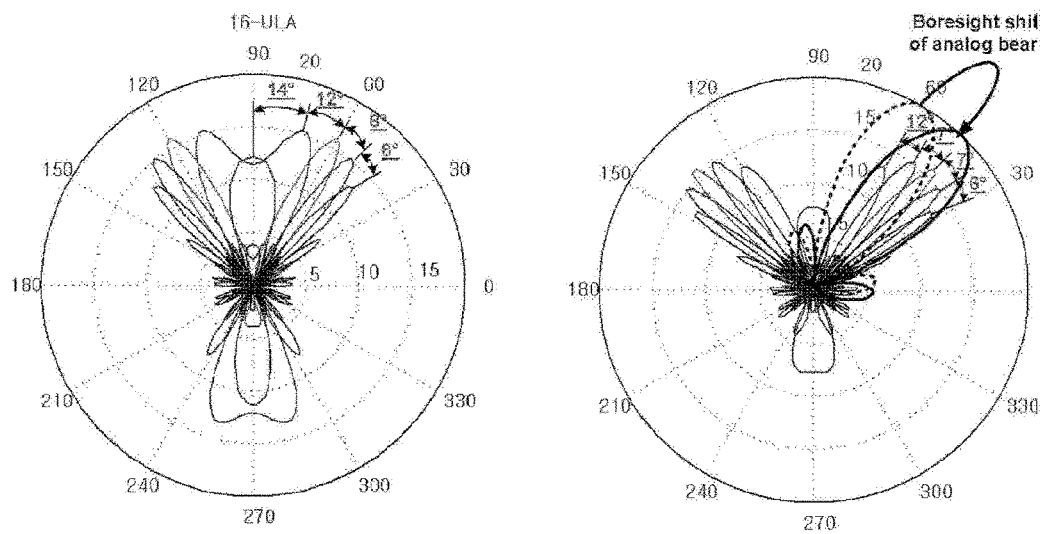
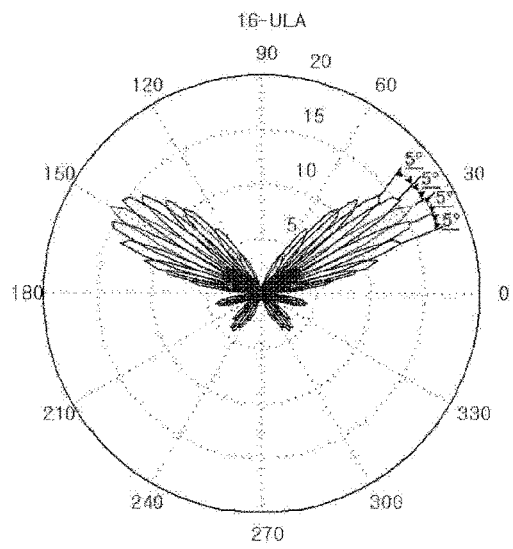

METHOD AND APPARATUS FOR TRANSMITTING AND RECEIVING CONTROL INFORMATION

This application is a 35 USC § 371 National Stage entry of International Application No. PCT/KR2016/001034 filed on Jan. 29, 2016, and claims priority to U.S. Provisional Application Nos. 62/181,774 filed Jun. 19, 2015; 62/184,879 filed Jun. 26, 2015 and 62/195,804 filed Jul. 23, 2015, all of which are hereby incorporated by reference in their entireties as if fully set forth herein.

TECHNICAL FIELD

The present invention relates to a wireless communication system, and more particularly, to a method and apparatus for transmitting and receiving uplink control information.

BACKGROUND ART

As a frequency of use of wireless communications of a user increases and the number of categories of services using wireless communications increases, the need for support of a high data rate and high quality of service (QoS) to a user who moves at high speed unlike in a conventional situation has been on the rise. For example, when a plurality of users who use public transportation want to watch multimedia during the ride or a plurality of passengers who ride a personal vehicle driving on a highway use different wireless communication services, a mobile communication system needs to support a high-quality wireless service to the above users.

The service is a new model that has not been present in a conventional wireless communication service model, and in order to support the service, there is a need to design a new system for innovatively enhancing a mobile communication network or embodying the mobile communication network rather than affecting a network infrastructure. As one of solutions for this, a vehicular multiple input multiple output (MIMO) system for installing a large size antenna array in a vehicle so as to allow the vehicle to receive a high-quality service also in a high speed movement situation via a large array gain and relaying received data by a central unit of the vehicle to a riding passenger has been considered.

When a large antenna array is installed outside a vehicle and wireless communications between a base station and a passenger in a vehicle is relayed through the large antenna array, degradation in communication performance may be prevented due to penetration loss with an average value of about 20 dB, a large array gain may be ensured due to use of many reception (Rx) antennas compared with a personal portable communication devices, and a distance between the Rx antennas may be easily ensured so as to easily ensure Rx diversity. Accordingly, the vehicular MIMO may provide an excellent communication service compared with a personal portable device without additional investment of infrastructures.

However, despite this advantage, there has been no example of a large antenna array installed in a vehicle. A vehicle is significantly expensive equipment compared with a conventional personal portable communication device and is not easy to improve and upgrade. In addition, the vehicle is equipment that satisfies as many as possible requirements such as design concept and an aeromechanical structure as well as communication performance, and thus it is not easy to install a large antenna array that limits aesthetic/aeromechanic vehicle design. In order to remove visual inconvenience of existing antennas, vehicle manufacturers have used a combination antenna with degraded performance compared with a single antenna.

In order to resolve spatial restriction of a large antenna array, installment of a distributed antenna array system for embodying an arrayed antenna system through a plurality of arrays instead of a single array in a vehicle has been considered.

DISCLOSURE

Technical Problem

An object of the present invention is to provide a method and apparatus for effectively transmitting and/or receiving control information in a wireless communication system.

Another object of the present invention is to provide a method and apparatus for effectively measuring and reporting a channel in a wireless communication system.

Still another object of the present invention is to provide a method and apparatus for effectively performing beamforming in a wireless communication system.

Still another object of the present invention is to provide a method and apparatus for effectively transmitting and/or receiving control information for beamforming in a wireless communication system.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

In a first aspect of the present invention, provided herein is a method for transmitting precoding information by a specific user equipment (UE) in a wireless communication system, the method comprising: receiving group information from a base station (BS), the group information comprising information indicating a representative UE in a UE group and information indicating one or more member UEs, the specific UE being one of the one or more member UEs; receiving first control information transmitted from the representative UE or the BS, the first control information comprising first precoding information; determining second precoding information based on the first precoding information; and transmitting second control information comprising the determined second precoding information to the BS.

In a second aspect of the present invention, provided herein is a user equipment (UE) configured to transmit precoding information in a wireless communication system, the UE comprising: a radio frequency (RF) unit configured to transmit and receive a radio signal; and a processor operatively connected to the RF unit and configured to: receive group information from a base station (BS), the group information comprising information indicating a representative UE in a UE group and information indicating one or more member UEs, the specific UE being one of the one or more member UEs; receive first control information transmitted from the representative UE or the BS, the first control information comprising first precoding information; determine second precoding information based on the first precoding information; and transmit second control information comprising the determined second precoding information to the BS.

Preferably, the first control information is scrambled based on identification information of the UE group, and the identification information of the UE group is shared in the UE group.

More preferably, the receiving the first control information comprises: descrambling the first control information using the identification information of the UE group; and acquiring the first precoding information from the descrambled first control information.

More preferably, the identification information of the UE group is pre-defined.

More preferably, the identification information of the UE group is transmitted by the representative UE to the one or more member UEs in the UE group.

Preferably, the method further comprises receiving identification information of the specific UE from the BS, wherein the second control information is scrambled using the identification information of the specific UE.

Preferably, the first precoding information is encrypted using encryption key information and the encryption key information is shared in the UE group.

Preferably, the first precoding information indicates a broad beam direction and the second precoding information indicates a fine beam direction.

Preferably, the first precoding information corresponds to a first precoder for analog beam precompensation and the second precoding information corresponds to a second precoder for digital fine tuning.

Preferably, the UE group is determined by the BS based on a broad beam direction.

Preferably, the method further comprises receiving configuration information of an uplink control channel for the representative UE from the BS, wherein the configuration information comprises at least one of format of the uplink control channel, resource information for the uplink control channel, transmission period information of the uplink control channel, and transmission offset information.

Preferably, the first control information is periodically transmitted through the uplink control channel.

Preferably, the first control information is periodically transmitted through an uplink shared channel.

Preferably, the second control information is transmitted through a physical uplink control channel.

Advantageous Effects

According to the present invention, control information may be effectively transmitted/received in a wireless communication system.

According to the present invention, a channel may be effectively measured and reported in a wireless communication system.

According to the present invention, beamforming may be effectively performed in a wireless communication system.

In addition, according to the present invention, control information for beamforming may be effectively transmitted and/or received in a wireless communication system.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

FIG. 1 is a diagram illustrating a distributed antenna system that may be considered in the present invention.

FIG. 2 is a diagram illustrating an example in which a distributed antenna unit is selected in a multi-vehicle situation.

FIG. 3 is a diagram illustrating a structure of PUCCH format 2/2a/2b in an LTE system.

FIG. 4 is a diagram illustrating an example of analog beam precompensation.

FIG. 5 is a diagram illustrating an example of digital fine tuning.

FIG. 6 is a diagram illustrating antenna array response using a hybrid beamforming scheme.

FIG. 7 is a diagram illustrating a problem in terms of beamforming based on a conventional codebook.

FIG. 8 is a diagram illustrating an example of UE grouping according to the present invention.

FIG. 9 is a diagram illustrating an example in which a fine beam direction is found according to the method in accordance with the present invention.

FIG. 10 is a diagram illustrating a BS 110 and a UE 120 to which the present invention is applicable.

FIG. 11 illustrates changes in beam resolution.

MODE FOR INVENTION

The following embodiments of the present invention may be applied to a variety of wireless access technologies such as code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through wireless (or radio) technology such as universal terrestrial radio access (UTRA) or CDMA2000. TDMA may be embodied through wireless (or radio) technology such as global system for mobile communication (GSM)/general packet radio service (GPRS)/enhanced data rates for GSM evolution (EDGE). OFDMA may be implemented by wireless (or radio) technology such as Institute of Electrical and Electronics Engineers (IEEE) 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of E-UMTS (Evolved UMTS), which uses E-UTRA. LTE-Advanced (LTE-A) is an evolved version of 3GPP LTE.

For clarity of explanations, the following description focuses on 3GPP LTE(-A) system. However, technical features of the present invention are not limited thereto. Further, a particular terminology is provided for better understanding of the present invention. However, such a particular terminology may be changed without departing from the technical scope of the present invention. For example, the present invention may be applied to a system in accordance with a 3GPP LTE/LTE-A system as well as a system in accordance with another 3GPP standard, IEEE 802.xx standard, or 3GPP2 standard.

In the present specification, a user equipment (UE) may be fixed or mobile. The user equipment (UE) refers to one of various apparatuses communicating with a base station (BS) to transmit and receive data and/or control information. The UE may be referred to as a terminal, a Mobile Station (MS), a Mobile Terminal (MT), a User Terminal (UT), a Subscriber Station (SS), a wireless device, a Personal Digital Assistant (PDA), a wireless modem, a handheld device, etc. In the present specification, the term "UE" may be interchangeably used with the term "terminal".

In the present specification, a base station (BS) generally refers to a fixed station that performs communication with a UE and/or another BS, and exchanges various kinds of data and control information with the UE and another BS. The base station (BS) may be referred to as an advanced base station (ABS), a node-B (NB), an evolved node-B (eNB), a base transceiver system (BTS), an access point (AP), a processing server (PS), a transmission point (TP), etc. In the present invention, the term "BS" may be interchangeably used with the term "eNB".

Distributed Antenna System

FIG. 1 is a diagram illustrating a distributed antenna system that may be considered in the present invention.

Referring to FIG. 1, antennas that have various shapes and radiation patterns according to an installment position may be distributed at a plurality of portions of a vehicle and a central unit (CU) for integrally controlling transmission and receiving signals through a distributed antenna unit (DU) may be installed. Through a configuration illustrated in FIG. 1, reception diversity gain may be maximized via use of an antenna array, and wireless access between a base station and a vehicle reception end may be prevented from being disconnected through cooperative reception between antennas with different radiation patterns in a high speed movement situation in which a communication environment is abruptly changed.

FIG. 2 is a diagram illustrating an example in which a distributed antenna unit is selected in a multi-vehicle situation.

When vehicles are close to each other in a limited area, it is difficult to separate and distinguish beams for users (e.g., vehicles) and distributed antenna arrays thereof due to an issue of beam sharpness in a vehicular distributed antenna array. For example, distributed antenna arrays positioned at very adjacent distances receive signals passing through similar channel environments, and thus the possibility that a plurality of DUs receive the same beam or are blocked by obstacles or cannot receive any beam is very high. Accordingly, in this case, as illustrated in FIG. 2, when a method for selectively activating/deactivating a DU of each vehicle is applied and each vehicle receives beams passing through as much as possible independent paths that experience different clusters from a beam that can be received by an adjacent vehicle through an activated DU of the corresponding vehicle, it may be more advantageous in terms of performance than in the case in which all DUs arranged in each vehicle are activated and used.

Channel State Information (CSI) Measurement and Report

In order to generate a beam appropriate for reception, a transmitting end needs to recognize information about a channel and to accurately measure the appropriate beam and a gain obtained by using the beam based on the recognized channel information. The channel information may be measured by transmitting a separate pilot to the transmitting end by a receiving end, but in the case of a current mobile communication system, the receiving end may measure a channel and then provide the measured information to the transmitting end in the form of CSI. When MIMO is implemented, a channel may be defined by combining sub channels generated between a plurality of transmission and reception antennas, and as the number of antennas used to implement the MIMO increases, a more complex structure may be obtained. According to a method for measuring and reporting channel information, the method may be divided into 1) an implicit CSI reporting method and 2) an explicit CSI reporting method.

The implicit CSI reporting method may be a method for interpreting measured channel information instead of information about a channel measured by a receiving end and selectively reporting only information that is materially required to generate a beam at a transmitting end. Compared with the explicit CSI reporting method, the implicit CSI reporting method is advantageous in that signaling overhead consumed to report CSI is small, and thus the implicit CSI reporting method has been used in a current mobile communication system. For example, the implicit CSI feedback information may include the following information.

When the implicit CSI feedback information has a limited number of precoder candidates, precoder index feedback (e.g., precoding matrix index, and PMI)

Channel Quality Information (CQI)

Rank Information (RI)

The explicit CSI reporting method may be a method for transmitting information that is as much as possible approximate information to a measurement value without interpreting a channel measured by the receiving end. Various methods for reducing signaling overhead used for CSI report via quantization or singular value decomposition (SVD) calculation of a MIMO channel expressed in the form of a matrix may be used. For example, the explicit CSI feedback information may have the following information.

Channel coefficient quantization & quantization index feedback

MIMO matrix or vector quantization & quantization index feedback

Channel covariance matrix feedback

Transmission of Eigen vector of Eigen matrix feedback or Channel matrix and/or Eigen value CSI in LTE System In most cellular systems including a LTE system, a UE may receive a pilot signal or reference signal for channel estimation from a base station, calculate channel state information (CSI), and report the CSI to the base station. The base station may transmit a data signal based on CSI information that is fed back from the UE. The CSI information that is fed back by the UE in the LTE system may include channel quality information (CQI), precoding matrix index (PMI), and rank indicator (RI).

CQI feedback may include radio channel quality information that is provided to a base station for the purpose of providing a guide about a modulation and coding scheme that is applied when the base station transmits data (e.g., link adaptation). When link quality between a base station and a UE is high, the UE may feedback a high CQI value and the base station may apply a relatively high modulation order and a low channel coding rate and transmit data. When link quality between the base station and the UE is low, the UE may feedback a low CQI value and the base station may apply a relatively low modulation order and a high channel coding rate and transmit data.

The PMI feedback may include preferred precoding matrix information that is provided to a base station for the purpose of providing a guide about a MIMO precoding scheme that is applied when the base station is installed with multiple antennas. The UE may estimate a downlink MIMO channel between the base station and the UE from a pilot signal and recommend MIMO precoding to be used by the base station through PMI feedback. An LTE system considers linear MIMO precoding that can be expressed in the form of a matrix for PMI configuration. The base station and the UE may share a codebook configured with a plurality of precoding matrices and each MIMO precoding matrix in the codebook may have a unique index. Accordingly, the UE may feedback an index corresponding to a MIMO precoding matrix that is most preferred in the codebook as PMI so as to minimize the amount of feedback information of the UE.

The RI feedback may include information about the number of preferred transmission layers that are provided to the base station for the purpose of providing a guide about the number of transmission layers preferred by the UE when the base station and the UE are installed with multiple antennas so as to perform multi-layer transmission through spatial multiplexing. The RI has a very close relationship with the PMI. This is because the base station can know precoding to be applied to each layer according to the number of transmission layers. With regard to a PMI/RI feedback configuration, a PMI codebook may be configured based on transmission of a single layer and then PMI may be defined and fed back for each layer, but this method is disadvantageous in that the amount of PMI/RI feedback information is largely increased according to increase in number of transmission layers. Accordingly, a PMI codebook according to the number of transmission layers may be defined in an LTE system. That is, N Nt×R matrices (R is the number of layers, Nt is the number of transmission antenna ports, and N is the size of a codebook) may be defined in a codebook for R layer transmission. Accordingly, the size of the PMI codebook may be defined irrespective of the number of transmission layers in the LTE system. Since PMI/RI is defined according to this structure, the transmission layer number R corresponds to a rank number of the precoding matrix (Nt×R matrix), and thus the transmission layer number R may be referred to as a rank indicator RI.

The CSI information may be obtained from an entire system frequency domain or obtained from a partial frequency domain. In particular, it may be useful to obtain and feedback CSI information about a partial frequency domain (e.g., subband) preferred by each UE in a system using orthogonal frequency division multiple access (OFDMA) technology.

The PMI/RI described in the specification is not limited to indicating an index value of a precoding matrix represented by a Nt×R matrix such as PMI/RI in the LTE system and a rank value of a precoding matrix. The PMI described in the specification may refer to preferred MIMO precoder information among MIMO precoders applicable in a transmission end, and the form of the precoder may not be limited to only a linear precoder that can be represented by a matrix such as in the LTE system. In addition, the RI described in the specification may include any feedback information that refers to a preferred transmission layer number in a broader meaning than in the LTE system.

The PMI information described in the specification is not configured by only one index. In the LTE-A system, a final PMI is divided into W1 as long term and/or wideband (WB) PMI and W2 as short term and/or sub-band (SB) PMI such that PMI with a dual structure is used. For example, the final PMI W may be defined as W=W1*W2 or W=W2*W1. For example, when the number of transmission antenna ports in the LTE-A is 8 or alternativeCodeBookEnabledFor4TX-r12=TRUE is configured via RRC signaling while the number of transmission antenna ports is 4, a final MIMO precoding matrix may be derived by only combining two indexes (WB PMI(W1) and SB PMI(W2)).

CSI Feedback Using Uplink Channel

In the LTE system, CSI feedback may be performed through an uplink channel. Periodic CSI feedback may be performed through a physical uplink control channel (PUCCH) and aperiodic CSI feedback may be performed through a physical uplink shared channel (PUSCH) as an uplink data channel. However, an information payload size in a reporting type may be defined according to a reporting mode and a mode state in CSI feedback through PUCCH, and a payload size of PUCCH format 2/2a/2b (PUCCH format 3 that can be used to apply carrier aggregation is excluded) that is defined in the LTE system may be very restrictive.

FIG. 3 is a diagram illustrating a structure of PUCCH format 2/2a/2b in an LTE system.

Cyclic shift (CS) of a sequence in each OFDM symbol may be used as PUCCH format. The cyclic shifted sequence may be generated by cyclic shifting a base sequence by as much as a specific CS amount.

FIG. 3 illustrates a channel structure of PUCCH format 2/2a/2b of one slot in a normal CP. PUCCH format 2/2a/2b may be generated through the following steps.

Step 1. 10 CQI information bits may be channel-coded at a ratio of 1/2 to obtain 20 coded bits. For example, a Reed-Muller (RM) code may be used in channel coding.

Step 2. A QPSK modulation symbol may be generated via scrambling and then QPSK constellation mapping (d0 to d4 in slot 0).

Step 3. Each QPSK modulation symbol may be modulated via cyclic shift of a base reference signal (RS) sequence with a length of 12 and then transmitted in each of 10 single carrier frequency division multiple access (SC-FDMAs) symbols in a subframe.

Step 4. 12 cyclic shifts that are uniformly spaced may be configured in such a way that 12 different UEs are orthogonally multiplexed in the same PUCCH resource block. A base RS sequence with a length of 12 may be used for a demodulation reference signal (DM RS) sequence applied to SC-FDMA symbols 1 and 5.

The 20 coded bits in Step 2 may be scrambled by a UE-specific scrambling sequence and may be represented according to Equation 1 below.

$$\tilde{b}(i)=(b(i)+c(i))\bmod 2 \quad\quad\quad [\text{Equation 1}]$$

In Equation 1, b(i) denotes a control information (or CQI information) bit sequence, c(i) denotes a scrambling sequence, $\tilde{b}(i)$ is a scrambled control information (or CQI information) bit sequence, and mod refers to modulo calculation. The scrambling sequence c(i) may be generated according to Equation 2 and initialized according to Equation 3 at every start of a subframe. In Equation 2, Nc may be 1600, $x_1(0)=1$, and $x_1(n)=0$, $n=1, \ldots, 30$.

$$c(n)=(x_1(n+N_C)+x_2(n+N_C))\bmod 2$$

$$x_1(n+31)=(x_1(n+3)+x_1(n))\bmod 2$$

$$x_2(n+31)=(x_2(n+3)+x_2(n+2)+x_2(n+1)+x_2(n))\bmod 2 \quad [\text{Equation 2}]$$

$$c_{init}=(\lfloor n_s/2 \rfloor+1)\cdot(2N_{ID}^{cell}+1)\cdot 2^{16}+n_{RNTI} \quad [\text{Equation 3}]$$

In Equation 3, $n_{RNTI}$ may refer to identification information of a corresponding UE and may be a cell-radio network temporary identifier (C-RNTI). Accordingly, when control information (or CQI information) is transmitted through a PUCCH, the control information may be scrambled based on the identification information of the corresponding UE, and another UE cannot recognize the identification information of the corresponding UE, and thus the another UE cannot acquire control information transmitted from the corresponding UE.

Multiuser MIMO for Vehicular Communications

In the case of single user MIMO (SU-MIMO), only data about one user is scheduled in the same time/frequency domain, whereas in the case of multiuser MIMO (MU-MIMO), data for a plurality of users may scheduled together in the same time/frequency domain. The MU-MIMO may multiplex data in the same time/frequency domain to obtain additional gain, but co-channel interference may occur due to users that are scheduled together, thereby causing system performance degradation.

A UE may feedback channel state information (CSI) of the UE, and a base station may schedule a user based on CSI that is fed back from the UE and optimize a system. However, in the case of a current LTE and LTE-A system, when a new UE is additionally scheduled in a SU-MIMO situation or an MU-MIMO situation, influence of interference between UEs, which is generated by scheduling the new UE in a new UE system, may not be considered. That is, only channel information obtained by considering SU-MIMO may be fed back, and the base station can recognize only a channel state of each separate user and cannot acquire information of interference experienced by users in MU-MIMO, and thus it is difficult to reduce influence of interference between the users. Accordingly, when SU-MIMO is converted into MU-MIMO or operates in a MU-MIMO manner, there is a need for a new method for sufficiently obtaining a multiplexing gain to be obtained via multiuser support.

As an example of solutions, a method for enhancing communication performance between multi users via cooperation of vehicles (users) in a dense vehicle environment may be considered.

Hybrid Beamforming (Hybrid BF)

A method obtained by combining analog beamforming and digital beamforming is referred to as joint hybrid beamforming. In the present specification, joint hybrid beamforming may be briefly referred to as a hybrid beamforming or joint beamforming. In joint hybrid beamforming, when conventional analog precoding and digital precoding are simply combined, the following problems may arise.

In hybrid beamforming, performance of conventional digital beamforming designed for dividing a uniform radiation angle may be degraded.

Even if the same digital codebook is used in different analog beamforming, final beams have different resolutions.

In order to overcome this problem, a new joint design method for a digital precoder in consideration of analog beamforming may be proposed. Table 1 shows comparison of an operating principle between a conventional (digital beamforming) scheme and a proposed (hybrid beamforming) scheme.

Design Principle of Digital Precoder for Joint Hybrid Beamforming

For design of joint hybrid beamforming, a digital beam coefficient may be divided into an analog beam precompensation part and a fine-tuning part. In this case, a final digital codebook for a digital codebook is designed in consideration of analog beamforming that is updated at a long-term period. The same design rule may be maintained irrespective of an analog beam angle.

Principle of Analog Beamforming Precompensation for Digital Precoder

In joint hybrid beamforming, as a setting value of analog beamforming is more accurately removed via precompensation, more accurate beamforming can be achieved. Accordingly, a base station may design an analog beam precompensation coefficient of a digital beamforming coefficient with an analog beam weight and an accurately inverted phase. The analog beam precompensation coefficient may change a direction of a target beam to a zero degree boresight irrespective of an analog beamforming angle, as illustrated in FIG. 4.

Principle of Fine-Tuning of Digital Precoder

With regard to a final beam setting value, a weight may be set based on a final beam direction which is in relative to 0° irrespective of an analog beamforming setting value. This is because a digital beamforming coefficient is obtained by combining two beamforming coefficients, as described above. As illustrated in FIG. 5, analog beam precompensation may refer to adjusting a beam to a zero degree direction. Accordingly, final target setting needs to be re-calculated based on 0 degree. Accordingly, a direction of a final beam may be set as a direction of φ+ψ.

Embodiment of Design of Digital Precoder for Joint Hybrid Beamforming

A digital beamforming coefficient design using the aforementioned digital precoder design principle for joint hybrid beamforming may be represented according to Equation 4 below.

$$v = \begin{bmatrix} v_1 \\ v_2 \\ \vdots \\ v_{N_{RF}} \end{bmatrix} = \begin{bmatrix} 1 \\ e^{j\pi \cdot N_t^{RF} \cdot 1 \cdot (\sin(\phi)-(\phi+\psi))} \\ \vdots \\ e^{j\pi \cdot N_t^{RF} \cdot (N_{RF}-1)(\sin(\phi)-\sin(\phi+\psi))} \end{bmatrix} \quad [\text{Equation 4}]$$

$$= \begin{bmatrix} 1 \\ e^{j\pi \cdot N_t^{RF} \cdot 1 \cdot \sin(\phi)} e^{-j\pi \cdot N_t^{RF} \cdot 1 \cdot \sin(\phi+\psi)} \\ \vdots \\ e^{j\pi \cdot N_t^{RF} \cdot (N_{RF}-1) \cdot \sin(\phi)} e^{-j\pi \cdot N_t^{RF} \cdot (N_{RF}-1) \cdot \sin(\phi+\psi)} \end{bmatrix}$$

TABLE 1

| Applied Scheme | Change in Beam Resolution | |
| --- | --- | --- |
| | In the same analog beam region | Between different analog beams |
| Digital BF<br>P = {P_1, P_2, P_3, P_4, ... } | Digital PMI resolution is varied according to boresight direction of analog beam<br>See FIG. 11(a) | Resolution of digital PMI for each analog beam is varied<br>See FIG. 11(b) |
| Joint BF design<br>X⊕P<br>X = {X_1, X_2, X_3, X_4, ... }<br>P = {P_1, P_2, P_3, P_4, ... }<br>X: Analog BF coefficient<br>P: Digital BF coefficient<br>⊕: Hadamard product | Digital PMI having the same resolution in analog beam is provided<br>See FIG. 11(c) | Apply analog beam linear compensation beamforming {X}<br>Provide digital PMI of the same resolution In the same analog beam boresight direction |

$$= \begin{bmatrix} 1 \\ e^{j\pi \cdot N_t^{RF} \cdot 1 \cdot \sin(\phi)} \\ \vdots \\ e^{j\pi \cdot N_t^{RF} \cdot (N_{RF}-1) \cdot \sin(\phi)} \end{bmatrix} \oplus \begin{bmatrix} 1 \\ e^{-j\pi \cdot N_t^{RF} \cdot 1 \cdot \sin(\phi+\psi)} \\ \vdots \\ e^{-j\pi \cdot N_t^{RF} \cdot (N_{RF}-1) \cdot \sin(\phi+\psi)} \end{bmatrix}$$

In Equation 4, ⊕ refers to Hadamard product, a coefficient positioned in the left of Hadamard product refers to an along beam precompensation part, and a coefficient positioned in the right of Hadamard product refers to a final digital beam part. v denotes a digital beamforming coefficient.

The joint hybrid beamforming scheme refers to design in which a digital beam coefficient is divided into an analog beam precompensation part and a fine-tuning part. According to the joint hybrid beamforming scheme, a final digital codebook may be designed as a digital codebook in consideration of analog beamforming updated at a long-term period. That is, the same design rule may be maintained irrespective of an analog beam angle.

For example, assuming that transmission data stream number $N_{RF}$ is 4, transmission radio frequency (RF) chain number $N_t^{RF}$ is 4, and transmission antenna number $N_t$ is 16, and assuming that a final beam direction is set as 35° by rotating the entire beam by φ=30° through analog beamforming and further rotating the beam by ψ=5° through digital beamforming, the digital beamforming coefficient may be given according to Equation 5 below. In Equation 5, v denotes the digital beamforming coefficient.

$$v = \begin{bmatrix} v_1 \\ v_2 \\ v_3 \\ v_4 \end{bmatrix} = \begin{bmatrix} 1 \\ e^{j\pi \cdot 4 \cdot 1 \cdot \sin(30°)} \\ e^{j\pi \cdot 4 \cdot 2 \cdot \sin(30°)} \\ e^{j\pi \cdot 4 \cdot 3 \cdot \sin(30°)} \end{bmatrix} \oplus \begin{bmatrix} 1 \\ e^{-j\pi \cdot 4 \cdot 1 \cdot \sin(35°)} \\ e^{-j\pi \cdot 4 \cdot 2 \cdot \sin(35°)} \\ e^{-j\pi \cdot 4 \cdot 3 \cdot \sin(35°)} \end{bmatrix} = \begin{bmatrix} 1 \\ e^{j\pi \cdot 4 \cdot \sin(30°)} \\ e^{j\pi \cdot 8 \cdot \sin(30°)} \\ e^{j\pi \cdot 12 \cdot \sin(30°)} \end{bmatrix} \oplus \begin{bmatrix} 1 \\ e^{-j\pi \cdot 4 \cdot \sin(35°)} \\ e^{-j\pi \cdot 8 \cdot \sin(35°)} \\ e^{-j\pi \cdot 12 \cdot \sin(35°)} \end{bmatrix}$$ [Equation 5]

An antenna array response vector to which the digital beamforming coefficient is applied may be given according to Equation 6 below.

$$\sum a(\theta) = (1 + \exp(j\pi[\sin(\theta) - \sin(\phi)]) + \exp(j\pi 2[\sin(\theta) - \sin(\phi)]) + \exp(j\pi 3[\sin(\theta) - \sin(\phi)])) \times$$
$$(v_1 + \exp(j\pi 4[\sin(\theta) - \sin(\phi)]) \cdot v_2 + \exp(j\pi 8[\sin(\theta) - \sin(\phi)]) \cdot v_3 + \exp(j\pi 12[\sin(\theta) - \sin(\phi)]) \cdot v_4)$$
$$= (1 + \exp(j\pi[\sin(\theta) - \sin(\phi)]) + \exp(j\pi 2[\sin(\theta) - \sin(\phi)]) + \exp(j\pi 3[\sin(\theta) - \sin(\phi)])) \times$$
$$\left(1 + \exp\left(j\pi 4 \begin{bmatrix} \sin(\theta) - \sin(\phi) + \\ \sin(\phi) - \sin(\phi + \psi) \end{bmatrix}\right) + \exp\left(j\pi 8 \begin{bmatrix} \sin(\theta) - \sin(\phi) + \\ \sin(\phi) - \sin(\phi + \psi) \end{bmatrix}\right) + \exp\left(j\pi 12 \begin{bmatrix} \sin(\theta) - \sin(\phi) + \\ \sin(\phi) - \sin(\phi + \psi) \end{bmatrix}\right)\right)$$ [Equation 6]
$$= (1 + \exp(j\pi[\sin(\theta) - \sin(\phi)]) + \exp(j\pi 2[\sin(\theta) - \sin(\phi)]) + \exp(j\pi 3[\sin(\theta) - \sin(\phi)])) \times$$
$$(1 + \exp(j\pi 4[\sin(\theta) - \sin\phi + (\psi)]) + \exp(j\pi 8[\sin(\theta) - \sin(\phi + \psi)]) + \exp(j\pi 12[\sin(\theta) - \sin(\phi + \psi)]))$$

When a final beamforming rotation angle is set as 35° by applying ψ=5° at φ=30° to Equation 6 above, the antenna array response vector may be given according to Equation 7.

$$\Sigma a(\theta) = (1 + \exp(j\pi[\sin(\theta) - \sin(30°)]) + \exp(j\pi 2[\sin(\theta) - \sin(30°)]) + \exp(j\pi 3[\sin(\theta) - \sin(30°)])) \times (1 + \exp(j\pi 4[\sin(\theta) - \sin(35°)]) + \exp(j\pi 8[\sin(\theta) - \sin(35°)]) + \exp(j\pi 12[\sin(\theta) - \sin(35°)]))$$ [Equation 7]

FIG. 6 is a diagram illustrating antenna array response using a hybrid beamforming scheme.

Referring to FIG. 6, when digital beamforming is performed on fine-tuning ψ=±5°, ±10°, and ±15° using digital beamforming, a shape of a beam of a final antenna array response vector is illustrated in FIG. 6. That is, it may be seen that accurate fine-tuning in a unit of 5° can be achieved. Accordingly, it may be seen that a hybrid beamformer can accurately control a beam through the proposed method for designing a digital beamforming coefficient.

Precoder and Channel Information Feedback Method in Hierarchical Structure

FIG. 7 is a diagram illustrating a problem in terms of beamforming based on a conventional codebook.

Like multiple vehicular MIMO, when UEs (e.g., vehicles) are close to each other in a limited area, beamforming based on a conventional codebook may be limited in terms of beam sharpness. For example, as illustrated in FIG. 7(A), it may be difficult to separate and distinguish beams for respective the dense UEs (e.g., users or vehicles) and distributed antenna arrays thereof.

In order to overcome this problem, beam resolution may be enhanced as in an example of FIG. 7(b). As a method for enhancing beam resolution, increase in codebook size may be considered. However, as described above, in a legacy LTE system, since a UE determines a precoder based on channel information measured by the UE and feedback the precoder in the form of PMI, when beam resolution is enhanced for fine tuning of a beam direction, a codebook size may be increased, and accordingly, the amount of information for feedback may be increased.

In addition, since a feedback payload size for CSI reporting defined in the legacy LTE standard is very restrictive, when a legacy codebook is used, it is maybe difficult to finely tune a precoder. Accordingly, unlike in a conventional method in which a UE determines a precoder, a method in which a base station determines some information in a hierarchical precoder structure and applies the information to design of a final precoder may be considered. In this case, even if the CSI feedback payload size is the same as a conventional codebook size, the final precoder may be more accurately determined.

The present invention proposes a method for designing a precoder with a new hierarchical structure and a channel information feedback method for multiple vehicular MIMO, in which a part of hierarchical information needed for precoder design is provided by a base station. For example, a method according to the present invention may be used in multiple vehicular MIMO based on cooperation between UEs (e.g., vehicles). As a detailed example, a method according to the present invention may be used to estimate and report channel information between each UE (e.g., vehicle) and a base station during multi-vehicle communication. Although the present invention is described in terms of multi-vehicle communication, the description is merely examples, and thus the present invention may also be applied in the same way in a general multiuser MIMO system situation.

The channel information estimating and reporting method based on a precoder with a hierarchical structure according to the present invention may include three steps.

Step 1-1: Grouping of UEs Based on Beam Direction

In Step 1-1, a base station may group UEs based on a beam direction. For example, the base station may group UEs having similar beam directions to one group. As a more detailed example, the base station may determine a precoder corresponding to a broad beam from itself to each UE, and may group UEs belonging to a similar broad beam direction in beam directions. In the specification, a precoder corresponding to a broad beam from a base station to a UE may be referred to as $P_{BR}$.

According to the present invention, a broad beam may be configured by a digital precoder or an analog precoder in terms of a precoder configuration. For example, when the aforementioned hybrid beamforming structure is used, the broad beam may be determined by analog precoding (or beamforming). As a detailed example, beamforming may be performed by configuring analog beamforming to a first direction (e.g., $\varphi$) as a boresight and then changing to a second direction (e.g., $\psi$) for fine tuning by a digital beam. In this case, for example, a digital precoder may be designed as shown in Equation 4 above. An analog beam precompensation part of a digital beam coefficient in the digital precoder of Equation 4 above may correspond to precoder $P_{BR}$ corresponding to a broad beam. In general, in the join BF design scheme shown in Table 1 above, X indicating analog beam precompensation beamforming may correspond to precoder $P_{BR}$ corresponding to a broad beam.

As a method for determining a direction of a broad beam of each UE by a base station, a determination method using preferred beam information feedback of a UE, a determination method using channel reciprocity based on a transmission signal of a UE, a determination method via position estimation (e.g., based on GPS), and an arbitrary combination method of the above methods may be considered. In particular, when the determination method using feedback is used, a method for reducing overhead in terms of a system by allowing only some UEs to perform feedback from among UEs that are highly likely to share a broad beam may be applied.

FIG. 8 is a diagram illustrating an example of UE grouping according to the present invention.

Referring to FIG. 8, assuming that precoders representing four broad beams are configured, a broad beam direction of each UE may be determined by a precoder that represents only a broad beam, and UEs may be grouped for respective broad beam directions. UE1 and UE2 may be mapped to beam #3 and UE3 may be mapped to beam #2 or #3. When a UE is covered by a plurality of broad beam directions like UE3, the base station may determine that any one of beams #2 and #3 may be used for UE3 instead of specifying one broad beam for UE3. In addition, a UE group for each broad beam direction may be represented by {UE3} with respect to beam #2 and represented by {UE1, UE2, UE3} with respect to beam #3.

Step 1-2: Feedback Information about Preferred Broad Beam by Specific UE to Base Station In Step 1-2 according to the present invention, information about a broad beam preferred by a UE may be transmitted to a base station. For example, information about a preferred broad beam by some UEs or a specific UE among adjacent UEs or grouped UEs may be fed back to the base station. A UE that performs feedback may be autonomously determined via cooperation between UEs. Alternatively, the UE that performs feedback may be a UE determined by the base station. Alternatively, the UE that performs feedback may be a specific type UE. Feedback information about preferred broad beam transmitted by the UE may include a plurality of beam information items.

The base station may receive information about a preferred broad beam from the UE and determine a broad beam based on the received information. The base station may notify the UE of information about the determined broad beam. In this regard, two methods are proposed as a method for notifying a UE group of information about the determined broad beam.

Method 2-A: A Base Station Notifies Each UE of Determined Broad Beam Information $P_{BR}$ In Method 2-A according to the present invention, a base station may notify each UE of broad beam information (or generally "control information"). In order to notify a UE group, corresponding to broad beam information, of the broad beam information, the base station may use the following method.

The base station may broadcast or multicast broad beam information to UEs belonging to a similar broad beam direction. For example, the base station may broadcast broad beam information to UEs belonging to a UE group or UEs grouped in Step 1-1 according to the present invention. As another example, the base station may multicast the determined broad beam information to UEs adjacent to a UE that that feedbacks information about a preferred broad beam.

The base station may notify specific UE(s) among UEs belonging to a similar broad beam direction of broad beam information via signaling, and the remaining UE(s) may overhear the corresponding signaling to obtain the broad beam information. For example, the base station may transmit a signal including broad beam information to specific UE(s) from among UEs belonging to the UE group or UEs grouped in Step 1-1 according to the present invention, and remaining UEs belonging to the UE group or grouped UEs may overhear the signal transmitted from the base station to obtain the broad beam information.

Method 2-B: A Specific UE Notifies Each UE of Broad Beam Information

In Method 2-B according to the present invention, a specific (or "representative") UE or some UEs may notify each UE in a group of broad beam information. In order to notify the UE group of the broad beam information, a specific UE or some UEs may use the following method.

A base station may notify only specific UE(s) among UEs belonging to a similar broad beam direction of broad beam information via signaling, and the UE(s) that receive the beam direction information may transmit corresponding information to the remaining UE(s) via a communication between UEs (e.g. a direct communication between UEs or a device-to-device (D2D) communication). For example, in case that the base station transmits a signal including the broad beam information to a specific UE or some UEs in the UE group, the UE that receives the signal may transmit the broad beam information to the remaining UE(s) in the UE group via communication between UEs.

When a specific UE feedbacks preferred broad beam information to the base station, neighboring UEs or other UEs belonging to a group may overhear the corresponding information.

According to the present invention, since the base station has already grouped UEs belonging to a similar broad beam, only some (or specific) UEs belonging to the same group may feedback broad beam information thereof to the base station. The remaining UEs in the group may indirectly acquire broad beam information by overhearing feedback information about a broad beam from the base station or a specific UE in the group. In the present specification, "overhearing" may refer to a specific UE receiving and/or obtaining UE-specific information (e.g. uplink control information (UCI)) of another UE. More specifically, "overhearing" may include the specific UE obtaining encryption key information for uplink control information of the another UE and the specific UE decoding and/or obtaining the uplink control information of the another UE using the obtained encryption key information. For example, by overhearing, the specific UE may obtain C-RNTI information of the another UE and may decode and/or obtain the uplink control information of the another UE using the obtained C-RNTI information. Accordingly, feedback overhead for broad beam information and signaling overhead for transmitting the determined broad beam information $P_{BR}$ to each UE may be reduced.

Step 1-3: A Precise Beam Direction is Found Based on Broad Beam Information

In Step 1-3 according to the present invention, a UE may find a precoder corresponding to a fine beam direction based on broad beam information. For example, the UE may find a fine beam direction $P_{FN}$ based on a precoder representing denser beam resolution within the determined broad beam direction, based on the broad beam information acquired in Step 1-2 above. The UE may find the precoder $P_{FN}$ corresponding to the fine beam direction and then transmit information P indicating the fine beam direction to the base station. The base station may acquire a final precoder having high beam resolution based on the information indicating a fine beam direction.

The fine beam direction may be represented by a digital precoder, an analog precoder, or a hybrid precoder. The base station may acquire a final precoder having high beam resolution via various combinations and calculations according to which type the $P_{BR}$ and $P_{FN}$ is among digital/analog/hybrid precoders and/or which hierarchical structure of codebook the $P_{BR}$ and the P is based on.

For example, in the case of hybrid beamforming, the $P_{BR}$ may correspond to a precoder for analog beam precompensation and the $P_{FN}$ may correspond to a digital precoder (for digital fine tuning). As a detailed example, the $P_{BR}$ may be a precoder for analog beam compensation represented by X shown in Table 1, the $P_{FN}$ may be a digital precoder represented by P, and a final precoder may be calculated in the form of X⊕P via Hadamard product.

FIG. 9 is a diagram illustrating an example in which a fine beam direction is found according to the method in accordance with the present invention.

Referring to FIG. 9, UE2 may belong to a group corresponding to beam #3 (broad) and UE2 may find a fine beam direction using one of fine beams represented by dashed lines based on a precoder representing finer beam resolution in the broad beam direction (beam #3).

In the example of FIG. 9, during determination of a fine beam, each UE (e.g., vehicle) may select a multiuser precoder that considers optimal interference between multi users in consideration of influence of an interference signal between UEs (e.g., vehicles or users) based on cooperation between UEs (e.g., vehicles or users).

As described above, a final precoder may be determined according to a precoder form (e.g., digital/analog/hybrid precoder) and/or codebook structure based on the fine beam direction. For example, in the case of hybrid beamforming, a broad beam direction (e.g., beam #3) may be represented by precoder $P_{BR}$ for analog precompensation, the fine beam direction may be represented by digital precoder $P_{FN}$, and the final precoder may be represented by $P_{BR} \oplus P_{FN}$ as Hadamard product between $P_{BR}$ and $P_{FN}$.

Scheme for Transmitting Uplink Control Information Based on Sharing Grouping Information and/or Specific UE ID Information within Group (or Between Adjacent UEs)

Beam information that is fed back to a base station by a UE may be transmitted via uplink control information (UCI). In more detail, preferred broad beam information and/or fine beam information that is fed back to the base station by the UE may be included in the uplink control information and transmitted to the base station. Since the uplink control information may be scrambled via a UE-specific scrambling sequence and transmitted through a physical uplink control channel (PUCCH) (e.g., refer to FIG. 3 and the description thereof), other UEs except for a specific UE cannot decode the corresponding uplink control information. For example, in a conventional LTE system, when a specific (or "representative") UE feedbacks uplink control information (UCI) through a PUCCH (e.g., PUCCH format 2/2a/2b) to the base station, neighboring UEs or other UEs belonging to a UE group cannot perform overhearing. Accordingly, in Method 2-B according to the present invention, when a specific UE feedbacks preferred broad beam information to the base station through uplink control information, neighboring UEs or other UEs belonging to the group cannot overhear the corresponding information.

In order to overcome this problem, the present invention proposes a method for overhearing uplink control information (including preferred broad beam information) by a neighboring UE or other UE belonging to the group to determine broad beam information (or to acquire uplink control information).

The uplink control information transmitting method according to the present invention may include two steps.

2-1. A base station may group UEs belonging to a similar broad beam direction and transmit/share group information (e.g., header (or "representative") UE/member UE configuration information) and/or identification information (e.g., C-RNTI) of a specific UE (e.g., a header UE) to each UE in the group.

The group information may indicate which is a header UE and/or a member UE among UEs in the group, to each UE. Alternatively, the group information may include information indicating a header UE among the UEs in the group and/or information indicating a member UE among the UEs in the group. In the present specification, the header UE may be referred to as a representative UE. For example, in Method 2-A in accordance with the present invention, the header UE may be a specific UE of which a base station notifies broad beam information. In another example, in Method 2-B in accordance with the present invention, the header UE may be a specific UE which notifies broad beam information. A member UE may refer to a UE other than the header UE in a group.

The identification information of the header UE may be transmitted to all (some) UEs in the group such that member UEs decode uplink control information (UCI) of the header UE, which is scrambled by a UE-specific scrambling sequence and transmitted through a physical uplink control channel (PUCCH). For example, the identification information of the header UE may be C-RNTI for the header UE.

Information such as group information and/or identification information of a header UE may be broadcast/multicast to UEs belonging to a group or transmitted via high layer signaling (e.g., RRC signaling).

2-2. A specific UE (e.g., a header UE) may feedback uplink control information (UCI) to a base station. For example, the uplink control information may be fed back through a PUCCH. In this case, neighboring UEs or other UEs belonging to a group may overhear a PUCCH signal between a header UE and the base station to acquire corresponding information (e.g. preferred broad beam information and/or fine beam information).

The neighboring UE or other member UEs belonging to the group may recognize PUCCH transmission of a header UE. For example, the base station may transmit a parameter indicating a PUCCH resource, allocated to the header UE that feedbacks uplink control information (UCI), to UEs in the group (or UEs adjacent to the header UE), and the UEs in the group (or UEs adjacent to the header UE) may receive a PUCCH signal using the indicated PUCCH resource. Parameter information indicating the PUCCH resource may be broadcast/multicast to UEs in the group or transmitted via high layer signaling (e.g., RRC signaling).

In addition, the base station may transmit PUCCH formation and PUCCH feedback periodicity/offset of the header UE to neighboring UEs or member UEs belonging to the group via high layer signaling (e.g., RRC signaling), and as such, corresponding UEs may recognize/receive periodic PUCCH transmission of the header UE.

The PUCCH format for transmission of the header UE may be as defined in the legacy LTE system, but the present invention is not limited thereto, and thus a new PUCCH format may be employed as compared to the legacy LTE system. For example, it may be possible to define new format including information (e.g. index) indicating whether corresponding PUCCH feedback is broad beam information $P_{BR}$ or fine beam information $P_{FN}$.

The other member UEs belonging to the group may descramble the PUCCH signal of the header UE and decode uplink control information UCI based on identification information (e.g., C-RNTI) of the header UE. The other member UEs belonging to the group may overhear the uplink control information UCI of the header UE and determine broad beam information $P_{BR}$ thereof based on the uplink control information UCI.

In the case of hybrid beamforming, a member UE may acquire the broad beam information $P_{BR}$ by directly overhearing beam index information of a broad beam of the header UE.

Define Group Share Identification Information (or Key Information) for Uplink Control Information (UCI) Encryption In Step 2-1 above of the method for transmitting uplink control information according to the present invention, a header UE may share identification information (or UE ID information) (e.g., C-RNTI) thereof such that member UEs in a group decode uplink control information (UCI) of the header UE that is scrambled by a UE-specific scramble sequence and transmitted through a PUCCH. In this case, problems may occur in terms of security in that when identification information (e.g., C-RNTI) of the header UE is shared with other UEs in the group, another member UE may misuse the identification information. Accordingly, the present invention proposes a method of setting separate identification information (or key information) sharable in a group without sharing the identification information (or UE ID information) of the header UE.

For example, a UE configured as a header may scramble uplink control information (UCI) thereof with a sequence based on x-RNTI and transmit the uplink control information (UCI). The x-RNTI may be pre-determined between member UEs in the group or used to scramble the uplink control information (UCI) by the header UE and shared and transmitted to member UEs in the group. Alternatively, the header UE may define separate key information for UCI encryption thereof and share and transmit encryption key information of the header UE such that member UEs in the group decode uplink control information (UCI) thereof.

For example, in the precoder design scheme of a hierarchical structure according to the present invention, information (or precoder information) $P_{BR}$ corresponding to a broad beam direction may be shared by all UEs in the group. On the other hand, information (or precoder information) $P_{FN}$ corresponding to a fine beam direction may be set for each UE (e.g., refer to FIG. 8 and the description thereof). $P_{BR}$ (or uplink control information including $P_{BR}$) to be shared by all (or some) UEs in the group may be encrypted (or scrambled) using identification information (or key information) (e.g., x1-RNTI, key-x1, and group member-shared key) sharable in the group, and $P_{FN}$ (or uplink control information including $P_{FN}$) set for each UE may be set to be encrypted (or scrambled) through UE-specific identification information (e.g., UE-specific ID, key-x2, and UE private key) like in a conventional case.

According to the present invention, in a MIMO system, uplink channel control information to be reported to a base station by a UE may be periodically fed back through a physical uplink control channel (PUCCH) or may be aperiodically fed back to a base station through a physical uplink shared channel (PUSCH). In addition, the proposed invention may be applied in a similar way to UCI feedback through a PUSCH as well as to UCI feedback through a PUCCH.

In the specification, although the methods according to the present invention have been described in terms of multi-vehicle communication, the present invention is not limited thereto and may be applied in the same way to a general multiuser multi antenna system situation. Thus, the present invention may be applicable to a UE other than a vehicle in the same or similar manner.

FIG. 10 is a diagram illustrating a BS 110 and a UE 120 to which the present invention is applicable.

Referring to FIG. 10, a wireless communication system includes the BS 110 and the UE 120. When the wireless communication system includes a relay, the BS 110 or the UE 120 can be replaced with the relay.

The BS 110 includes a processor 112, a memory 114, and a radio frequency (RF) unit 116. The processor 112 may be configured to embody the procedures and/or methods proposed by the present invention. The memory 114 is connected to the processor 112 and stores various pieces of information associated with an operation of the processor 112. The RF unit 116 is connected to the processor 112 and transmits/receives a radio signal. The UE 120 includes a process 122, a memory 124, and an RF unit 126. The processor 122 may be configured to embody the procedures and/or methods proposed by the present invention. The memory 124 is connected to the processor 122 and stores various pieces of information associated with an operation of the processor 122. The RF unit 126 is connected to the processor 122 and transmits/receives a radio signal.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

Specific operations to be conducted by the base station in the present invention may also be conducted by an upper node of the base station as necessary. In other words, it will be obvious to those skilled in the art that various operations for enabling the base station to communicate with the terminal in a network composed of several network nodes including the base station will be conducted by the base station or other network nodes other than the base station. The term "base station (BS)" may be replaced with a fixed station, Node-B, eNode-B (eNB), or an access point as necessary. The term "terminal" may also be replaced with a user equipment (UE), a mobile station (MS) or a mobile subscriber station (MSS) as necessary.

The embodiments of the present invention may be achieved by various means, for example, hardware, firmware, software, or a combination thereof. In a hardware configuration, an embodiment of the present invention may be achieved by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

It will be apparent to those skilled in the art that various modifications and variations can be made in the present invention without departing from the scope of the invention. Thus, it is intended that the present invention cover the modifications and variations of this invention provided they come within the scope of the appended claims and their equivalents.

INDUSTRIAL APPLICABILITY

The present invention is applicable to a wireless communication apparatus such as a user equipment (UE), a base station (BS), etc.

The invention claimed is:

1. A method for transmitting precoding information by a specific user equipment (UE) in a wireless communication system, the method comprising:
receiving group information from a base station (BS), the group information comprising information indicating a representative UE in a UE group and information indicating one or more member UEs, the specific UE being one of the one or more member UEs;
receiving first control information transmitted from the representative UE or the BS, the first control information comprising first precoding information;
determining second precoding information based on the first precoding information; and
transmitting second control information comprising the determined second precoding information to the BS,
wherein the first precoding information indicates a broad beam direction and the second precoding information indicates a fine beam direction.

2. The method according to claim 1, wherein the first control information is scrambled based on identification information of the UE group, and the identification information of the UE group is shared in the UE group.

3. The method according to claim 2, wherein receiving the first control information comprises:
descrambling the first control information using the identification information of the UE group; and
acquiring the first precoding information from the descrambled first control information.

4. The method according to claim 2, wherein the identification information of the UE group is pre-defined.

5. The method according to claim 2, wherein the identification information of the UE group is transmitted by the representative UE to the one or more member UEs in the UE group.

6. The method according to claim 1, further comprising:
receiving identification information of the specific UE from the BS,
wherein the second control information is scrambled using the identification information of the specific UE.

7. The method according to claim 1, wherein the first precoding information is encrypted using encryption key information and the encryption key information is shared in the UE group.

8. The method according to claim 1, wherein the first precoding information corresponds to a first precoder for analog beam precompensation and the second precoding information corresponds to a second precoder for digital fine tuning.

9. The method according to claim 1, wherein the UE group is determined by the BS based on a broad beam direction.

10. The method according to claim 1, further comprising:
receiving configuration information of an uplink control channel for the representative UE from the BS,
wherein the configuration information comprises at least one of format of the uplink control channel, resource information for the uplink control channel, transmission period information of the uplink control channel, and transmission offset information.

11. The method according to claim 10, wherein the first control information is periodically transmitted through the uplink control channel.

12. The method according to claim 1, wherein the first control information is periodically transmitted through an uplink shared channel.

13. The method according to claim 1, wherein the second control information is transmitted through a physical uplink control channel.

14. A user equipment (UE) configured to transmit precoding information in a wireless communication system, the UE comprising:
a transmitter and receiver; and
a processor operatively connected to the transmitter and receiver and configured to:
control the receiver to receive group information from a base station (BS), the group information comprising information indicating a representative UE in a UE group and information indicating one or more member UEs, the specific UE being one of the one or more member UEs;
control the receiver to receive first control information transmitted from the representative UE or the BS, the first control information comprising first precoding information;
determine second precoding information based on the first precoding information; and
transmit second control information comprising the determined second precoding information to the BS,
wherein the first precoding information indicates a broad beam direction and the second precoding information indicates a fine beam direction.

15. The UE according to claim 14, wherein the first control information is scrambled based on identification information of the UE group, and the identification information of the UE group is shared in the UE group.

16. The UE according to claim 15, wherein the processor is further configured to:
descramble the first control information using the identification information of the UE group; and
acquire the first precoding information from the descrambled first control information.

17. The UE according to claim 15, wherein the identification information of the UE group is pre-defined.

18. The UE according to claim 15, wherein the identification information of the UE group is transmitted by the representative UE to the one or more member UEs in the UE group.

19. The UE according to claim 14, wherein the processor is further configured to:
receive identification information of the specific UE from the BS,
wherein the second control information is scrambled using the identification information of the specific UE.

20. The UE according to claim 14, wherein the first precoding information is encrypted using encryption key information and the encryption key information is shared in the UE group.

* * * * *